(12) United States Patent
Rolfes et al.

(10) Patent No.: US 6,505,752 B1
(45) Date of Patent: *Jan. 14, 2003

(54) VACUUM INSULATED COFFEE SERVER

(76) Inventors: Patrick J. Rolfes, 2006 Seadrift Dr., Corona Del Mar, CA (US) 92625; Douglas K. Blair, 1696 Ave. Road, #1208, Toronto, Ontario (CA), M5M 3Y4

( * ) Notice: Subject to any disclaimer, the term of this patent is extended or adjusted under 35 U.S.C. 154(b) by 146 days.

This patent is subject to a terminal disclaimer.

(21) Appl. No.: 09/640,559

(22) Filed: Aug. 18, 2000

(51) Int. Cl.⁷ .......................... A47J 41/02; B65D 25/28; B65D 51/18
(52) U.S. Cl. ............................. 220/592.16; 220/62.12; 220/62.18; 220/254.3; 220/592.22; 220/592.27; 220/753; 215/13.1; 222/475.1; 222/500
(58) Field of Search .................. 220/592.16, 592.01, 220/592.18, 592.27, 254.1, 254.3, 577, 592.2, 592.17, 592.22, 592.23, 592.28, 62.12, 62.18, 753; 215/13.1, 235; 222/129–131, 146.1, 146.2, 183, 500, 465.1, 475.1, 566, 567, 570

(56) References Cited

U.S. PATENT DOCUMENTS

| | | | | |
|---|---|---|---|---|
| 3,561,632 A | * | 2/1971 | Shirae | 215/315 |
| 3,799,408 A | * | 3/1974 | Palmer | 222/474 |
| 4,121,730 A | * | 10/1978 | Dammer | 215/310 |
| 4,520,716 A | * | 6/1985 | Hayes | 99/306 |
| 4,625,884 A | * | 12/1986 | Zimmermann | 215/309 |
| 4,658,973 A | * | 4/1987 | Zimmermann | 215/12.1 |
| 4,768,664 A | * | 9/1988 | Zimmermann | 215/12.1 |
| 5,473,974 A | * | 12/1995 | Chang | 99/308 |
| 6,269,984 B1 | * | 8/2001 | Murakami | 222/472 |
| 6,301,961 B1 | * | 10/2001 | Rolfes et al. | 220/592.26 |
| 6,314,866 B1 | * | 11/2001 | Melton | 99/322 |
| 6,332,557 B1 | * | 12/2001 | Moran | 220/592.16 |

* cited by examiner

*Primary Examiner*—Lee Young
*Assistant Examiner*—Niki M. Eloshway
(74) *Attorney, Agent, or Firm*—Gordon K. Anderson (57) ABSTRACT

A coffee server for serving brewed coffee is insulated with a partial vacuum pulled in a void (36) between the walls of an outer vessel (20) and an inner vessel (32). The outer and inner vessels are fabricated of metal and have a top narrow neck opening (22) and (34) that are attached together with a hermetic seal (42). The partial vacuum is for minimizing heat loss conducted through the combined vessels permitting coffee placed inside to retain its useable heat content for at least six hours without additional heat being added. A pour spout neck (44) is fitted to the vessel necks and provides a liquid flow path when the server is tilted to pour coffee that is stored inside. An offset brew though stopper (52) including a hinged cover (58), is removably attached to the pour spout neck with the cover pivoted to permit coffee from a brewer to enter the server through an offset portion of the stopper during the filling process. A handle (68) is attached to pour spout neck on one end and to the bottom of inner vessel on the other end for lifting and handling the server. A transparent tube (78) with a nozzle (80) on an open end is in communication with the bottom portion of the inner vessel and the tube is encased within the handle permitting visual indication of the liquid level through a slot in the handle.

20 Claims, 5 Drawing Sheets

VACUUM INSULATED COFFEE SERVER

TECHNICAL FIELD

The present invention relates to coffee servers in general. More specifically to a coffee server with vacuum insulation between inner and outer structural members and an optional liquid level gauge in the handle.

BACKGROUND ART

Previously, many types of coffee servers have been used in endeavoring to provide an effective means to transport coffee from the brewer to the user and to store the brewed coffee until required. The most popular method of conveying and retaining brewed coffee is by the use of a glass carafe permitting visual indication of the level of coffee remaining in the container. Some prior art has attempted to maintain the temperature of the coffee by using an insulated container such as a thermal carafe utilizing an evacuated section in between two separate transparent shells.

A search of the prior art did not disclose any patents that read directly on the claims of the instant invention, however the following U.S. patents are considered related:

| Pat. No. | Inventor | Issue Date |
| --- | --- | --- |
| 5,968,618 | Miller | Oct. 19, 1999 |
| 5,653,362 | Patel | Aug. 5, 1997 |
| 5,083,502 | Enomoto | Jan. 28, 1992 |
| 4,625,884 | Zimmernann | Dec. 2, 1986 |
| 4,058,338 | Brown | Nov. 15 1977 |
| Des.271,074 | Richardson | Oct. 25, 1983 |
| Des.268,319 | Donoski et al. | Mar. 22, 1983 |
| Des.251,821 | Levine | May 15, 1979 |

Miller in U.S. Pat. No. 5,968,618 teaches a thermal coffee carafe with a heat resistant outer shell of tempered glass or heat resistant plastic capable of nesting onto a coffee maker without deformation or deterioration due to the heat evolved. The carafe also has an interior globe which only comes in contact with the outer shell at the top with the cavity in between being evacuated to a lower pressure that atmosphere. The outer shell and interior globe are ultrasonically bonded together or attached with an epoxy and are transparent for indicating the level of the coffee inside. A lid is included to permit replenishment of coffee to the interior globe.

U.S. Pat. No. 5,653,362 of Patel is for a thermal lid and beverage server with the lid attached pivotally to the top of the body. The lid has a conical passage with a floatable ball located within the passage such that when no liquid is entering, the ball seals the opening. A pouring spout extends from the body near the top and when the server is tilted the lid pivots assisted by a counter weight integral with the lid.

U.S. Pat. No. 5,083,502 issued to Enomoto is for a coffee making machine that roasts and grinds beans then blows air onto the coffee grinds for cooling. The machine then pours hot water over the grounds, brewing the coffee and then pours the finished coffee into a server that has a heater underneath for maintaining the desired serving temperature.

Zimmernann teaches in U.S. Pat. No. 4,625,884 an insulated jug of molded construction including a handle and pouring spout. A recess is formed in the top of the housing to receive a threaded lid for sealing the lid to the jug. Pouring is accomplished using relieved portions on the threaded part of the lid which when unthreaded permits liquid to flow from the container.

Brown in U.S. Pat. No. 4,058,338 discloses a handle assembly for a glass carafe using a band that is positioned around the neck. A plastic handle is connected to a metal band and there are two slots for receiving the ends of the metal bands for temporarily holding the band on the carafe during securement.

Richardson in U.S. design patent Des.271,074 depicts a coffee server that is apparently transparent, as diagonal lines are included in FIG. 4. The handle is shown as an integral part of the server as no other method of attachment is illustrated. A pouring spout is shown on the side opposite the handle with a gusset joining the body and the bottom is flat in the middle with a upward taper on its periphery.

Design Pat. No. Des.268,319 issued to Donoski et al. illustrates the design of a carafe made of a transparent material with a handle having a band that attaches around the neck of the body. The top appears to be open with a small spout for directing the liquid from the upper opening surface opposite the handle.

Levine in U.S. design patent Des.251,821 discloses what appears to be a metallic server with an open top and a handle that is attached on one side. The bottom has a flat surface in the middle and is upwardly tapered on the periphery. A rolled lip is shown on the top and a bead on the bottom apparently to join the bottom to the cylindrical body. There does not appear to have any other seams and no lid is illustrated.

DISCLOSURE OF THE INVENTION

In the past it has been customary to employ a glass carafe for use with a automatic coffee maker which has advantages in that it is light in weigh and offers visual indication of the level of coffee inside. However on the down side, glass by its vary nature, is rather fragile and therefore susceptible to breakage. Further heat is transferred easily through the thin walls of the vessel requiring a warmer integral with the brewer, necessitating returning the carafe to the brewer as soon as it has been used to transport the coffee to the users cup to maintain the proper temperature for the next time it is to be served. A further drawback to its use is that if a person is touched by the outside of the carafe when coffee is present inside it may cause a painful burn on the skin as the coffee temperature is usually just below its boiling point which is sufficient to inflict injury. It is therefore a primary object of the invention to use an insulated metallic server as a replacement for a glass carafe on existing brewers. The invention accomplishes all of the necessary utility as it is physically the same basic size and configuration particularly on the bottom which readily interchanges with the glass variety and the handle is of the same angular displacement making it easy to carry and pour coffee into a cup. Probably the most significant object is that the temperature of the coffee within the server may be maintained for a long period of time without the necessity of continual re-heating as required by the glass carafe. The invention employ's a vacuum insulated server that is made of metal that is capable of maintaining the temperature of its liquid contents for as long as six hours at a temperature acceptable to serving coffee which is normally a minimum of 160 degrees F. (71.11 degrees C.). It may be clearly seen that this improvement in functional characteristics has great value and can actually change the way coffee is served in commercial and industrial establishments in the future.

An important object of the invention is that it ultimately saves electricity as no heat is necessary from a warmer that is normally always turned on during the hours of usage.

Further, since the server is thermally insulated residual heat is not transferred into the room from the hot coffee stored inside. When included with the heat dissipated by the warmer, the air conditioning load may be significantly reduced particularly if a number of brewers are in use at the same time as is often the case in restaurants and large commercial buildings.

Another object of the invention is directed to the hinged cover on the stopper which permits filling the server from most conventional coffee brewers when the lid is opened with the lifting tab and tilted back until it rests on the handle. It is also important that when the server is tilted to pour liquid from pour spout neck into a coffee cup, the shape of the cone is offset sufficiently to preclude liquid from flowing out of the stopper through the cone instead from the spout underneath.

Still another object of the invention is that the stopper is removable for cleaning by simply rotating it some 60 degrees counterclockwise. This function is easily understood and is intuitively obvious to someone familiar with cooking utensils.

Yet another object of the invention is that metal is inherently more durable than glass which is obviously easily broken. It is well known that if a glass carafe containing hot coffee is dropped and broken the liquid splatters and covers a wide area with disastrous results. Shards of broken glass may also be propelled indiscriminately as a result of the impact which by themselves may be dangerous to persons within there trajectory. If the carafe is the vacuum liner type they are very fragile and may break with a slight bump or jar particularly if they are full of liquid, however they do not have the same problem of spreading the hot liquid in a large area as they are self protected. At any rate a metal vacuum insulated server overcomes all of the above disadvantages since it is robust and will withstand minor rough handling without any problems and even a fall from a few feet may only cause, at worst, a small dent without any of the above disastrous consequences.

A further object of the invention permits placing the server on a table or even leaving it there for an extended period of time without burning a person if the outside of the surface is touched since it is thermally insulated. As such the temperature of the outside surface will be only be a few degrees above the surrounding ambient temperature. With this in mind the probably of discoloration of a table top due to excessive heat is also completely eliminated.

A final object of the invention permits visual viewing of the level of coffee in the server by the simple addition of a sight gauge in the handle. This feature is particularly advantageous in a commercial surrounding where it is necessary to know at a glance how much coffee is remaining in the server. The invention includes such a device in the preferred embodiment using a transparent tube that is vented to atmosphere on the top and is completely enclosed within the handle and yet visible through a slot performing fully within the parameters of a conventional liquid level gauge or sight tube.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
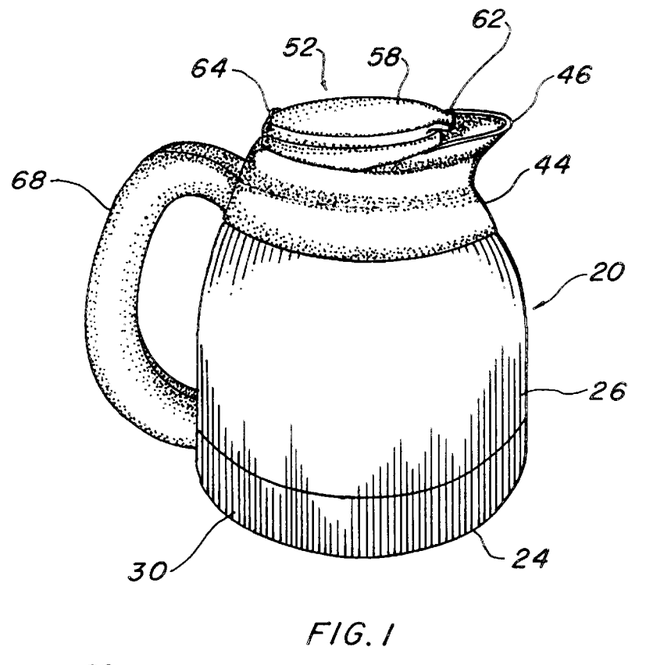
FIG. 1 is a partial isometric view of the preferred embodiment.
Figure 2:
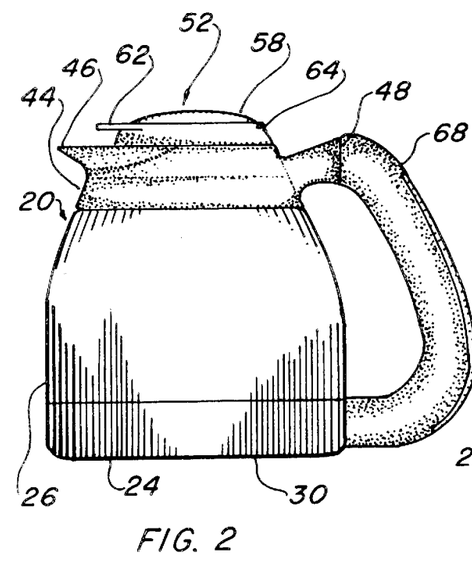
FIG. 2 is a right elevation view of the preferred embodiment with the left elevation view being a mirror image thereof
Figure 3:
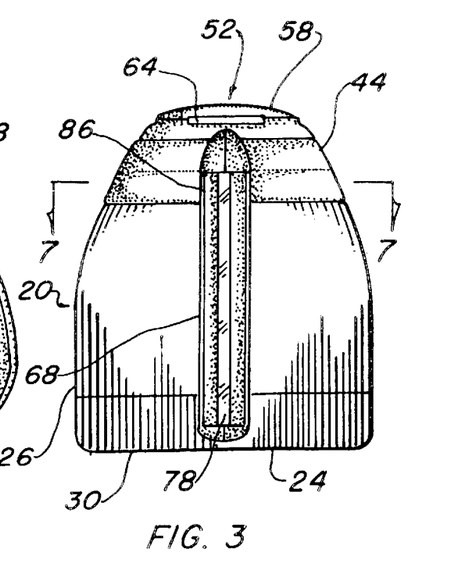
FIG. 3 is a rear elevation view of the preferred embodiment.
Figure 4:
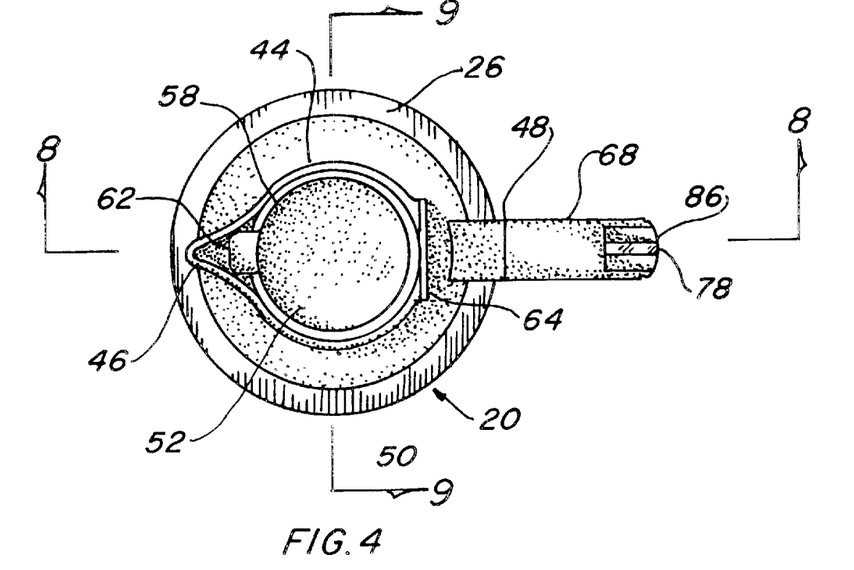
FIG. 4 is a top view of the preferred embodiment.
Figure 5:
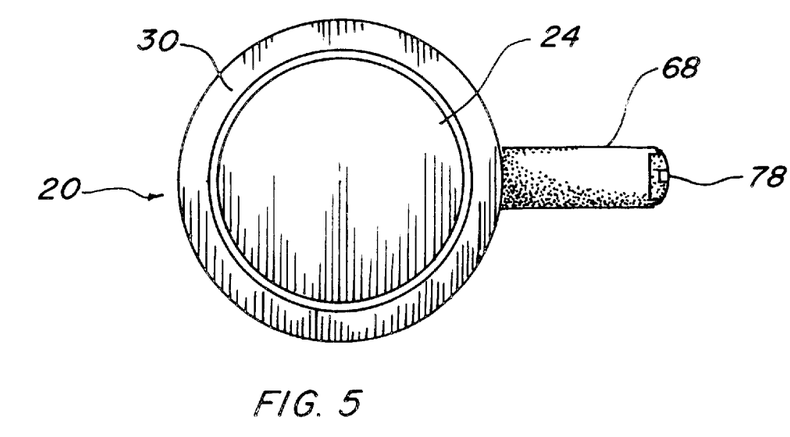
FIG. 5 is a bottom view of the preferred embodiment.

The best mode for carrying out the invention is presented in terms of a preferred and a second embodiment. The preferred embodiment is shown in FIGS. 1 thorough 9 and is comprised of a metallic outer vessel 20 that has a top narrow neck opening 22 and a bottom 24 which has a configuration shaped to fit onto a conventional coffee brewer warmer. The outer vessel 20 is made in three separate pieces which constitute an upper hull 26 and a lower hull 28 that are bonded together with a hermetic seal. The lower hull 28 is basically horizontal and is configured in a "S" shape. The third member of the outer vessel is a bottom pan 30 pressed into a bottom portion of the upper hull 26 as shown in FIG. 9. It should be noted that the hermetic seal bond may be almost any type as it is hidden and needs to be only a vapor tight connection such as an weld, a brazed joint, a tight pressed fit, a bond using a thermoset plastic such as epoxy or any other type of bond that is in common use in the industry. It is be notable that the outside shape of the outer vessel 20 may vary and still be within the scope of the invention however the preferred shape is shown in the drawings and as such is flat on the bottom with a raised portion on an inside diameter that matches the configuration of most warmers on existing coffee brewers. The side walls are vertical for a short distance from the bottom and then taper inwardly until they form the top narrow neck opening 22.

A metallic inner vessel 32 is disposed within the outer vessel 20 and is configured to also have a top narrow neck 34 in the same shape but slightly smaller than the outer vessel top opening 22. The top narrow neck 34 is contiguously nested into the outer vessel neck opening 22, and the two cooperatively create, or leave, a void 36 therebetween in the balance of the opposed surface areas. The inner vessel 32 is formed in two pieces which include an inner vessel top 38 and a inner vessel bottom 40 that are joined together with a hermetic seal which in this case is preferably a weld joint.

Figure 8:
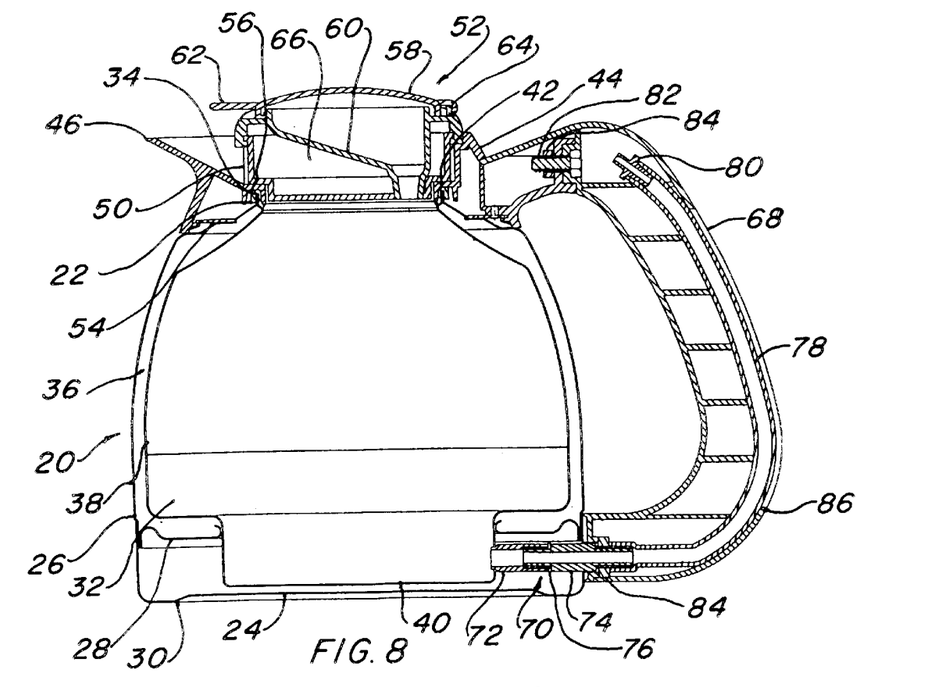
FIG. 8 is a cross sectional view taken along lines 8—8 of FIG. 4.
Figure 9:
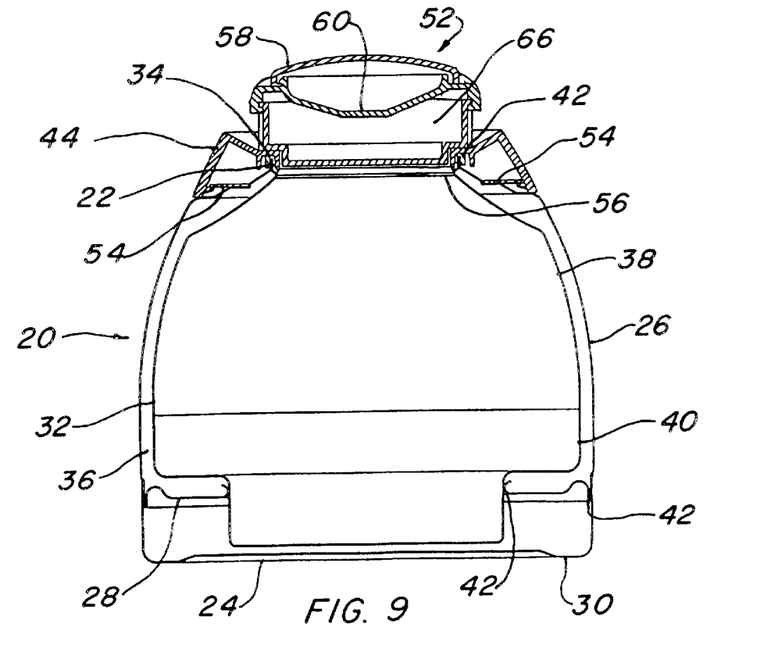
FIG. 9 is a cross sectional view taken along lines 9—9 of FIG. 4.
Figure 10:
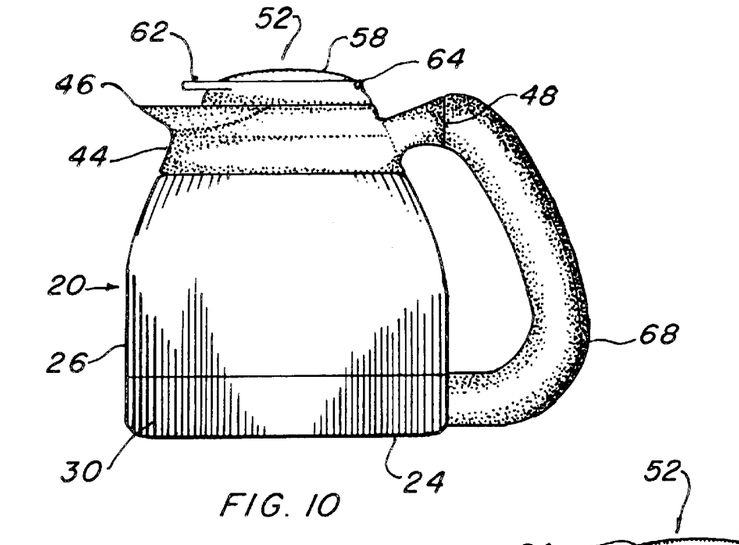
FIG. 10 is a right elevation view of the second embodiment with the left elevation view being a mirror image thereof.
Figure 11:
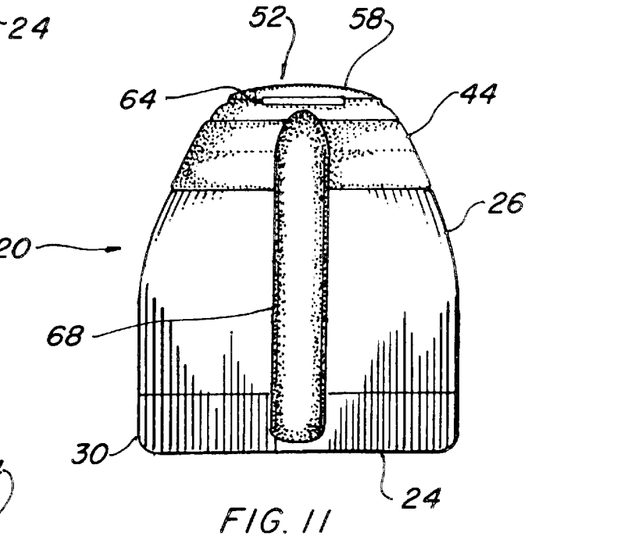
FIG. 11 is a rear elevation view of the second embodiment.
Figure 12:
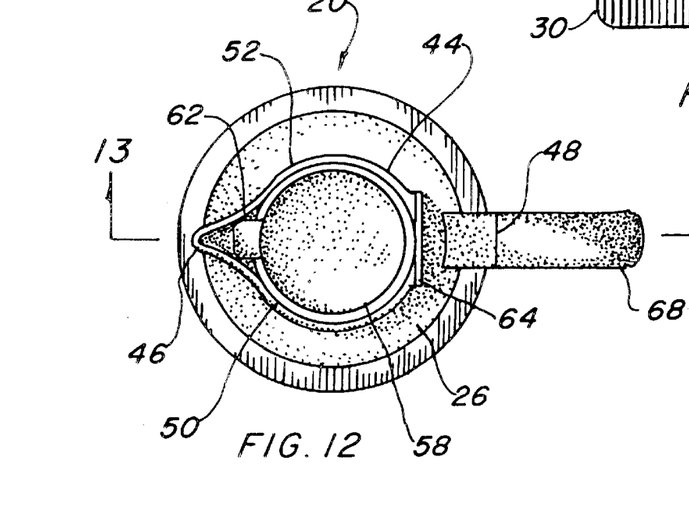
FIG. 12 is a top view of the second embodiment.
Figure 13:
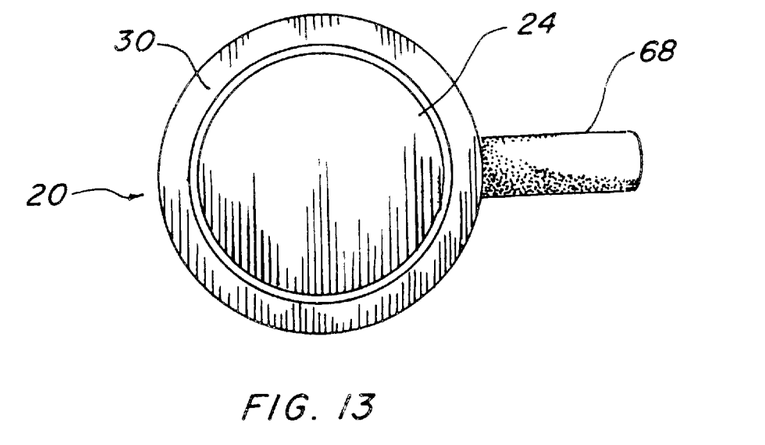
FIG. 13 is a bottom view of the second embodiment.
Figure 14:
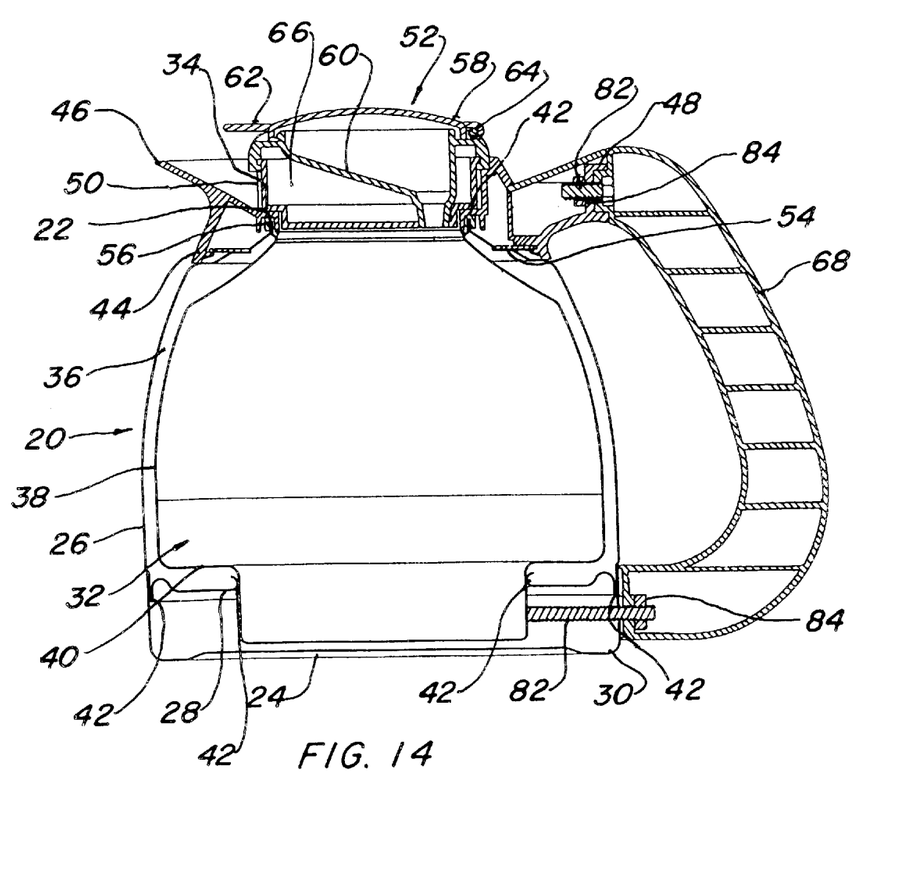
FIG. 14 is a cross sectional view taken along lines 14—14 of FIG. 12.

Further, the completed inner vessel 32 is joined to the outer vessel 20 with a hermetic seal at both the neck 22 and 34 and bottom lower hull 28 to the inner vessel bottom 40 as shown in FIGS. 8 and 9. It should be noted at this point that for clarity's sake the hermetic seal is designated 42 on the drawings in all of its configurations and locations. This sealing procedure allows the void 36 therebetween to have pressure within reduced below that of typical prevailing atmospheric conditions creating a partial vacuum, preferably evacuated to at least 2.5 mm of mercury for optimum heat transfer results. It has been found that with this void 36 between the outer vessel 20 and the inner vessel 32 with its partial vacuum, the server retains heat content of a full pot of coffee permitting a degradation of temperature from 200 degrees F. (93.33 degrees C.) to 160 degrees (71.11 degrees C.) for a period of no less than 6 hours at an ambient temperature of 75 degrees F. (23.89 degrees C.).

The outer vessel 20 and inner vessel 32 are made of almost any type of metal such as aluminum, carbon steel, brass, copper, titanium etc. with stainless steel in all its varieties being preferred. The wall thickness may vary with the size of the server however its overall size should be of interest that the most common volume of glass carafe that the invention is replacing is the 64 ounce (1.9 liters) capacity which normally has a height of around 7.00 inches (7.8 cm) and a nominal diameter of 7.25 inches (18.4 cm).

A pour spout neck 44 is attached to the associated vessel necks 22 and 34 thus furnishing a liquid flow path from the interior of the inner vessel 32 to beyond the outside surface of the server in order to conveniently tilt the server and pour coffee into a cup. This pour spout neck 44 includes a tapered spout 46 on one side and handle receiving means 48 on the opposite side with a socket 50 in between. The tapered spout 46 is shown best in FIGS. 1, 2, 4 and 8 and the handle receiving means in FIGS. 2, 4 and 8. The socket 50 is circular and configured to rotatably receive a offset brew through stopper 52. The pour spout neck 44 is attached to the outer vessel 20 by snapping over a ring 54 and also it interfaces with a gasket 56, or the like, that fits over the narrow necks 22 and 34 as illustrated in FIGS. 8 and 9. This gasket 56 may be resilient or semi-rigid enough to grip the junction of the necks 22 and 34 and the spout neck 44 in order to create a liquid tight seal. The configuration of the stopper 52 and the socket 50 within the pour spout neck 44 permits rotation of the stopper 52 of from 55 to 65 degrees rotation for removal and attachment of the stopper 52 to the pour spout neck 44. In use the stopper 52 is inserted into the pour spout neck 44 and manually twisted clock-wise locking it securely in place, with removal just the opposite.

Figure 6:
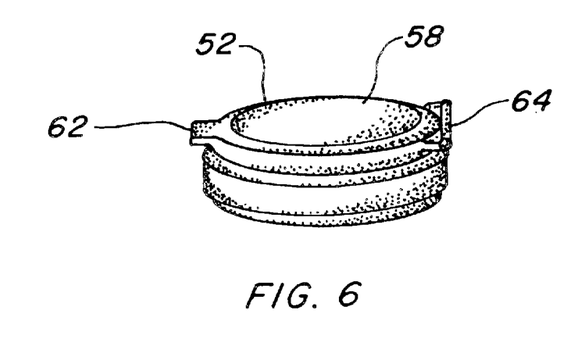
FIG. 6 is a partial isometric view of the offset brew through stopper completely removed from the invention for clarity.

The offset brew through stopper 52 is illustrated by itself in FIG. 6 and in cross section in FIGS. 8 and 9 and includes a hinged cover 58 pivoted to an open position for permitting coffee from the brewer to enter the server through an offset portion of the stopper for filling the server. The offset portion of the stopper 52 is defined as an offset cone 60 that is configured such that when the server is tilted to pour liquid from the pour spout neck 44, the cone 60 is offset sufficiently to preclude liquid from flowing out of the stopper 52 through the cone 60. The hinged cover 58 includes a lifting tab 62 on the hinged cover first side and hinge means 64 on the hinged cover second, or opposite side configured such that the hinged cover 58 of the stopper may rotate at least 180 degrees permitting brewed coffee to enter the offset stopper 52 and direct the coffee into the servers interior. The offset brew though stopper 52 further includes a dead air space 66 in its interior acting as an insulator retarding heat transfer thorough the stopper itself A handle 68 is attached to pour spout neck 44 on one end and to the bottom 40 of inner vessel 32 on the other end permitting easy lifting of the server and pouring coffee therefrom. The inner vessel bottom 40 has a hollow spud assembly 70 attached thereunto that extends through the outer vessel bottom pan 30. This spud assembly 70 is comprised of a spud 72 and a coupling 74 threadably attached to the spud 72 with an o-ring 76 in between, and a transparent tube 78 in communication with the coupling 74 with a nozzle 80 on the open end. The tube 78 is encased in the handle 68 permitting visual indication of liquid level. Liquid within the server is visible through a slot in the handle 68 as it is directly in line with the transparent tube 78 and the coffee within the server flows into the tube since its upper end is above the servers maximum liquid level and is vented to atmosphere through the nozzle 80. Therefore the level in the tube 78 corresponds with the level within the server. The pour spout neck 44 has a stud 82, as shown in FIG. 8, that is also attached thereunto, thus in concert with the hollow spud assembly 70 each having internally threaded nuts 84 screwed securely thereupon, provide attachment means for the handle 68 to the server as illustrated.

While the outer and inner vessel 20 and 32 are made of metal the pour spout neck 44, offset brew through stopper 52 and handle 68 are preferably fabricated of either a thermoset or a thermoplastic material that is functional at temperatures well above the boiling point of water and have sufficient structural integrity to withstand continual usage and indelicate handling normally found in the application.

Figure 7:
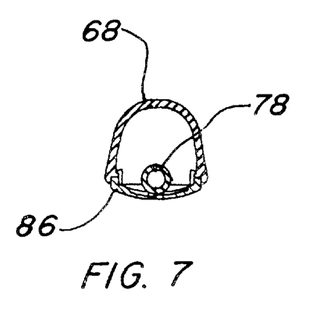
FIG. 7 is a partial cross sectional view taken along lines 7—7 of FIG. 3 illustrating the handle construction.

The second embodiment is illustrated in FIGS. 10 through 14 and is identical to the preferred embodiment with the exception that the visual indication of the liquid level within the server is omitted. In situations where this feature is not necessary the initial procurement is obviously less expensive to the user as it is easier to manufacture. Instead of attaching the handle 68 at the bottom end with the hollow spud assembly 70 a second stud 82 is attached to the inner vessel bottom 40 that extends through the outer vessel bottom pan 30. The pour spout neck 44 uses the same stud 82 as in the preferred embodiment, thus in concert they provide the necessary attachment means to connect the handle 68 to the server using the corresponding internally threaded nuts 84. The handle 68 obviously does not require the slot in the outside surface however it may optionally be left in place or have a special blank cover plate similar to the preferred cover plate 86 as illustrated in FIG. 7. This alternative eliminates special tooling for the handle 68 if the preferred embodiment is already in production.

In use the invention replaces the glass carafe and functions in the exact same manner with the server placed on the platform of the brewer and the hinged cover 58 opened and the brewed coffee is introduced into the server through the offset cone 60 of the stopper 52. When brewing is completed the cover 58 is snapped shut and coffee is then poured into cups from the spout 46. It should be noted that the warmer on the brewer should be disconnected as it uses electrical energy unnecessarily and would actually heat up the outer vessel 20 which would be detrimental to its utility.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A vacuum insulated metallic coffee server comprising:
   a metallic outer vessel having a top narrow neck opening also a bottom configured to fit a conventional coffee brewer,
   a metallic inner vessel within the outer vessel also having a top narrow neck slightly smaller than the outer vessel top opening, contiguously nested into said outer vessel neck opening, cooperatively creating a void therebetween,
   said void between said outer vessel and said inner vessel having decreased pressure below that of typical prevailing atmospheric conditions creating a partial vacuum for minimizing heat loss conducted through the combined vessels permitting coffee therein to retain its heat content for a predetermined length of time,
   a pour spout neck disposed upon the associated vessel necks providing a liquid flow path from the inner vessel interior when the server is tilted,
   an offset brew through stopper having a hinged cover, with said stopper removably attached to pour spout neck and the cover pivoted to an open position for permitting coffee from a brewer to enter the server through an offset portion of the stopper for filling the server, and
   a handle, having ends, attached to pour spout neck on one end and to the inner vessel bottom on the other end for lifting the server and pouring coffee therefrom.

2. The vacuum insulated metallic coffee server as recited in claim 1 wherein said outer vessel further comprises, a upper hull and a lower hull bonded together with a hermetic seal.

3. The vacuum insulated metallic coffee server as recited in claim 2 wherein said outer vessel further comprises, a bottom pan pressed into a bottom portion of the upper hull.

4. The vacuum insulated metallic coffee server as recited in claim 3 wherein said outer vessel bottom pan further comprises, a flat periphery and a recessed center portion having dimensions to conform in shape to that of a conventional coffee brewer warming plate.

5. The vacuum insulated metallic coffee server as recited in claim 1 wherein said inner vessel further comprises, an inner vessel top and a inner vessel bottom joined together with a hermetic seat.

6. The vacuum insulated metallic coffee server as recited in claim 5 wherein said inner vessel is joined to the outer vessel with a hermetic seal at both the neck and bottom providing said void therebetween thus allowing pressure within to be reduced below that of typical prevailing atmospheric conditions creating a desired partial vacuum.

7. The vacuum insulated metallic coffee server as recited in claim 1 wherein said void between said outer vessel and said inner vessel is evacuated to at least 2.5 mm of mercury.

8. The vacuum insulated metallic coffee server as recited in claim 1 wherein said metallic coffee server, including its void between said outer vessel and said inner vessel and its partial vacuum, retains heat content of a full pot of coffee permitting a degradation of temperature from 200 degrees F. (93.33 degrees C.) to 160 degrees (71.11 degrees C.) for a period of no less than 6 hours at an ambient temperature of 75 degrees F. (23.89 degrees C.).

9. The vacuum insulated metallic coffee server as recited in claim 1 wherein said pour spout neck further comprises, a tapered spout on one side and handle receiving means on an opposite side with a socket in between configured to rotatably receive said stopper.

10. The vacuum insulated metallic coffee server as recited in claim 9 wherein said socket within the pour spout neck and configuration of the stopper permits rotation of the stopper of from 55 to 65 degrees rotation for removal of the stopper from the pour spout neck.

11. The vacuum insulated metallic coffee server as recited in claim 1 wherein said offset brew through stopper further comprises, an offset cone configured such that when the server is tilted to pour liquid from the server pour spout neck, the cone is offset sufficiently to preclude liquid from flowing out of the stopper through the cone.

12. The vacuum insulated metallic coffee server as recited in claim 1 wherein said offset brew through stopper further comprises, a lifting tab on said hinged cover first side and hinge means on said hinged cover second opposite side configured such that the hinged cover of the stopper may rotate at least 180 degrees permitting brewed coffee to enter the offset stopper and direct the coffee into the servers interior.

13. The vacuum insulated metallic coffee server as recited in claim 1 wherein said offset brew through stopper further having a dead air space in its interior acting as an insulator retarding heat transfer thorough the stopper.

14. The vacuum insulated metallic coffee server as recited in claim 1 wherein said inner vessel further having a hollow spud assembly attached thereunto that extends through said outer vessel and said pour spout neck having a stud also attached thereunto, thus in concert providing attachment means for said handle to the server.

15. The vacuum insulated metallic coffee server as recited in claim 14 wherein said spud assembly further comprises a spud and a coupling with an o-ring threadably attached to said spud with a transparent tube having a nozzle on an open end in communication with the coupling and the tube encased within the handle permitting visual indication of liquid within the server through the handle.

16. The vacuum insulated metallic coffee server as recited in claim 15 wherein said handle is attached to said coupling and said stud with internally threaded nuts.

17. The vacuum insulated metallic coffee server as recited in claim 1 wherein said inner vessel further having a stud attached thereunto that extends through said outer vessel and said pour spout neck having a stud also attached thereunto, thus in concert providing attachment means for said handle to the server.

18. The vacuum insulated metallic coffee server as recited in claim 17 wherein said handle is attached to said studs with internally threaded nuts.

19. A vacuum insulated metallic coffee server with provisions for viewing the level of coffee within the server comprising:
   a metallic outer vessel configured to fit a conventional coffee brewer,
   a metallic inner vessel within the outer vessel contiguously nested into said outer vessel, cooperatively creating a void therebetween,
   said void between said outer vessel and said inner vessel having decreased pressure below that of typical prevailing atmospheric conditions creating a partial vacuum for minimizing heat loss conducted through the combined vessels permitting coffee therein to retain its heat content for a predetermined length of time,
   a pour spout neck disposed upon the associated inner and outer vessels providing a liquid flow path from the inner vessel interior when the server is tilted,
   an offset brew through stopper, removably attached to said pour spout neck permitting coffee from a brewer to enter the server for filling, and a handle, having ends, attached to pour spout neck on one end and to the inner vessel bottom on the other end for lifting the server and pouring coffee therefrom, said handle further having a slot therein and a transparent tube with a nozzle on an open end in communication with the inner vessel and the tube encased within the handle permitting visual indication of liquid within the server through the slot in the handle.

20. A vacuum insulated coffee server comprising:

a metallic outer vessel configured to fit a conventional coffee brewer, a metallic inner vessel nested within said outer vessel, cooperatively creating a void therebetween, having decreased pressure within the void creating a partial vacuum for minimizing heat loss conducted through the combined vessels permitting coffee therein to retain its heat content for a predetermined length of time, a pour spout neck disposed upon the inner and outer vessels providing a liquid flow path from the inner vessel interior when the server is tilted, an offset brew through stopper, removably attached to said pour spout neck permitting coffee from a brewer to enter the server for filling, and a handle attached to pour spout neck on one end and to the inner vessel bottom on the other end for lifting the server and pouring coffee therefrom.

\* \* \* \* \*